UNITED STATES PATENT OFFICE.

ELLEN ROHRER, OF MONMOUTH, OREGON.

IMPROVEMENT IN REMEDIES FOR DISEASES OF THE THROAT AND LUNGS.

Specification forming part of Letters Patent No. 174,442, dated March 7, 1876; application filed January 11, 1875.

*To all whom it may concern:*

Be it known that I, ELLEN ROHRER, of Monmouth, in the county of Polk and State of Oregon, have invented a new and useful Improvement in Medical Compound, of which the following is a specification:

This invention and discovery relates to the art of healing; and consists of the compound composed substantially as hereinafter described, the compound being used as a medium for the cure of throat and lung diseases.

In carrying out my discovery I employ two vegetable ingredients—one of which is an evergreen shrub, known on the western coast as "mountain-balm." This plant is indigenous to the mountains of southern Oregon and portions of California, and is botanically known as *Eriodyction Californicum*, also as "Wigandia," being also known locally as "Tar-Bush" and "Yerba Santa." The other ingredient of my compound is the root of a plant indigenous to the mountains of Oregon, which is called "consumption-root." This plant is a species of *Polemonium*, known as "Jacob's Ladder," (*P. reptans*.)

The compound is prepared as follows: In a glass jar containing equal parts of alcohol and water I put in an excess of the leaves of the mountain-balm. In another glass jar, containing equal parts of alcohol and water, I put in an excess of the consumption-root. Each part is allowed to stand for the space of about fourteen days, when tinctures of the full strength of the ingredients are obtained. These tinctures, with a simple sirup, (made from about four and a half pounds of loaf-sugar to one quart of water,) are mixed together in the following proportions: Tincture of mountain-balm, three ounces; tincture of consumption-root, one ounce; simple sirup, eight ounces.

The compound is put up in bottles, and is ready for use. It is used with great success in all diseases of the throat and lungs, and may be employed in cases of general debility and kindred diseases with good results.

This medicine is pleasant to the taste, harmless to the system, and most prompt in its action upon the diseased organs.

Having thus described my invention, I claim as new and desire to secure by Letters Patent—

The herein-described medical composition, composed of consumption-root (Jacob's Ladder, or *Polemonium reptans*) and mountain-balm, (*Eriodyction Californicum*, or Wigandia,) substantially as described.

ELLEN ROHRER.

Witnesses:
G. M. BEELER,
S. S. WHITMAN.